United States Patent

Hug

[11] 3,838,870
[45] Oct. 1, 1974

[54] MOTOR VEHICLES BODIES
[75] Inventor: Karl Hug, Niedernausen, Germany
[73] Assignee: General Motors Corporation, Detroit, Mich.
[22] Filed: Feb. 5, 1973
[21] Appl. No.: 329,588

[30] Foreign Application Priority Data
Feb. 10, 1972 Germany.............................. 2206329

[52] U.S. Cl. ......... 280/150 SB, 280/150 B, 297/384
[51] Int. Cl. ........................................... B60r 21/04
[58] Field of Search.................. 280/150 B, 150 SB; 296/65 A; 297/384, 385, 386, 404; 244/122 R, 122 B

[56] References Cited
UNITED STATES PATENTS
| | | | |
|---|---|---|---|
| 2,267,103 | 12/1941 | Ireland............................ | 297/404 X |
| 2,973,029 | 2/1961 | Schlosstein..................... | 297/404 X |
| 3,488,090 | 1/1970 | Douglas..................... | 280/150 SB X |

Primary Examiner—David Schonberg
Assistant Examiner—Michael J. Forman
Attorney, Agent, or Firm—Herbert Furman

[57] ABSTRACT

A motor vehicle body includes a seat, having a backrest and a head-rest mounted on the back-rest, and means effective, upon engagement therewith by an occupant of the seat moving in response to the effect upon him of a predetermined deceleration of the vehicle body, to transmit a loading developed by the mass inertia of the occupant's body to the head-rest. The head-rest is thereby moved forward and energy absorber means secured between the head-rest and an anchorage on the body resist the forward movement of the head-rest, and also resist backward movement of the head-rest upon impact thereon of the backwardly moving head of the occupant. The above arrangement is effective in the case of both frontal and rear impacts on the vehicle. Advantageously a seat belt arrangement is provided to transmit the loading from the occupant to the head-rest.

10 Claims, 10 Drawing Figures

MOTOR VEHICLES BODIES

This invention relates to motor vehicles bodies including occupant seats having a head-rest capable of reducing the severity of injury to the head and cervical vertebrae of the seat occupant in the event of a collision.

Deformable, and therefore energy-consuming head-rests have been provided on the back-rests of vehicle seats to protect the seat occupant's head during a collision. However, although the angular inclination of such a head-rest relative to the back-rest can be adjusted to suit the seat occupant this adjusted position then determines the position at which the head-rest will engage the occupant's head during the collision. The further back the head-rest is tilted the further the head has to travel before it meets the head-rest and consequently the greater the loading imposed on the cervical vertebrae of the spinal column. It is highly desirable therefore that the head-rest should not only be capable of absorbing impact energy within a predetermined path of movement and in controlled and predictable manner, but that the occupant's head should be intercepted by the head-rest as soon as possible during its backward movement.

It is an object of the invention to meet the above requirements in a simple and advantageous manner by providing a head-rest mounted on a seat back-rest for movement forwardly and rearwardly of the seat back-rest and by providing that at a predetermined deceleration of the vehicle a loading resulting from the mass inertia of an occupant of the seat is transmitted to the head-rest to move the head-rest forwardly to a position in which the head-rest can intercept the backwardly flung head of the occupant before the head has travelled backwards any substantial distance.

It is a further object of the invention to provide energy absorber means secured to the head-rest and to an anchorage on the motor vehicle body and deformable upon movement of the head-rest to resist forward movement of the head-rest and resist backward movement of the head-rest upon impact thereon of the backwardly moving head of the occupant.

Another object of the invention is to provide a head-rest capable of meeting the above-mentioned requirements and whose mode of operation is not directly dependent on vehicle deceleration.

As is well known from tests, in the event of an accident, the retardation of the vehicle occupant who has been strapped in his seat belt arrangement is not phase with the retardation of the vehicle. This is due to the fact that the seat belt arrangement allows some degree of movement or play of the occupant's body relative to the vehicle body and so as a general rule the rate of deceleration of the vehicle will have declined from its maximum before the seat belt arrangement receives its maximum stressing or loading from the occupant's body. This out of phase characteristic together with the delay induced by the effect of the occupant's neck muscles in holding the head against forward movement results in the occupant's head bending forward when the vehicle is stationary or almost stationary. Thus in these circumstances the forward movement of the head-rest, dependent as it is upon vehicle deceleration, is at its maximum when the rate of deceleration of the vehicle is at its maximum, and the occupant's head is still substantially upright and not bent forward from the position it was in at the moment of impact on the vehicle. In these circumstances the head-rest would strike the occupant's head, and in order to prevent this undesirable occurrence or at least to mitigate the injury that could result from such action the head-rest must be retarded so that it does not contact the occupant's head before the head has bent forward. The need for such retardation is obviated by arranging in accordance with the present invention that such movement of the head-rest is controlled by the deceleration of the occupant and not by deceleration of the vehicle.

As the occupant moves forward from his seat as a result of the deceleration of the vehicle the mass inertia of his body develops a loading which can be transmitted to the head-rest to effect forward movement of the head-rest substantially in phase with the movement of the occupant's body. As the occupant's body moves forward it could engage means to transmit the loading to the head-rest thereby to move the head-rest forwardly. Such means could include a stop or trigger directly mechanically connected with the head-rest, or electrical circuitry including an electric motor.

Referring now to the drawings.

Figure 1:
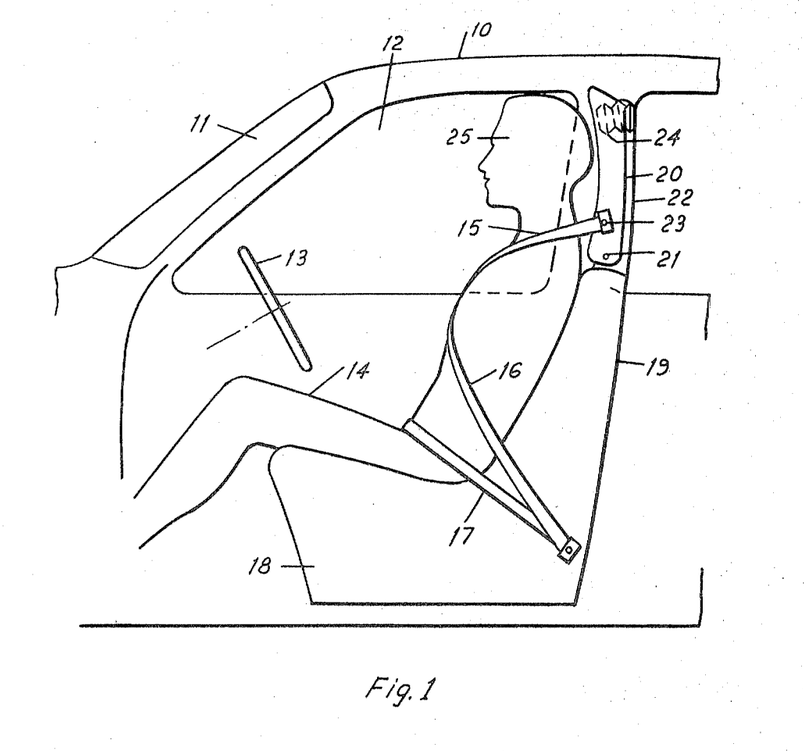
FIG. 1 is a schematic side view with parts cut away of a portion of a motor vehicle body according to one embodiment of the invention and showing the vehicle driver sitting normally in the vehicle with his head adjacent the head-rest of his seat.
Figure 2:
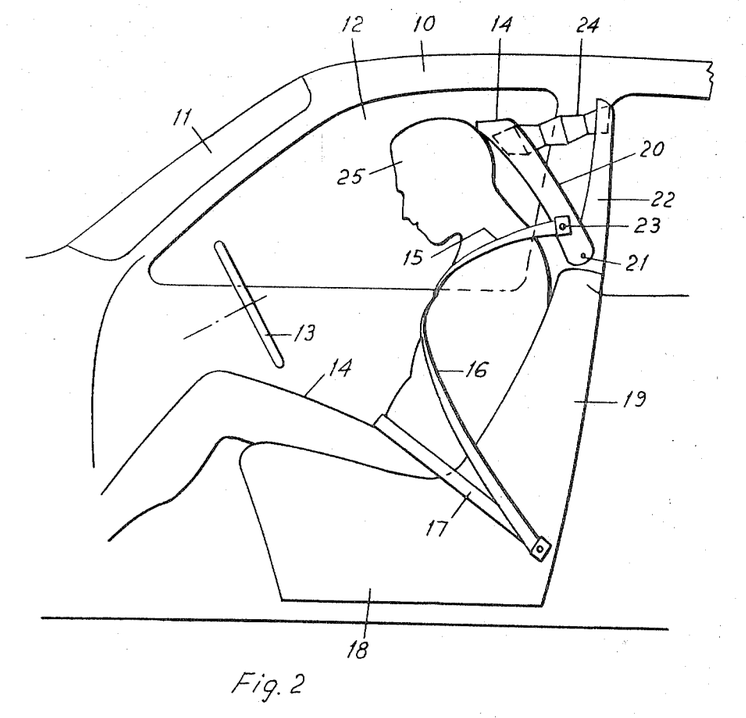
FIG. 2 is a view similar to FIG. 1 but showing the driver's head bent forward immediately after a frontal impact on the vehicle, and showing also the forward movement of the head-rest resulting from the impact.
Figure 3:
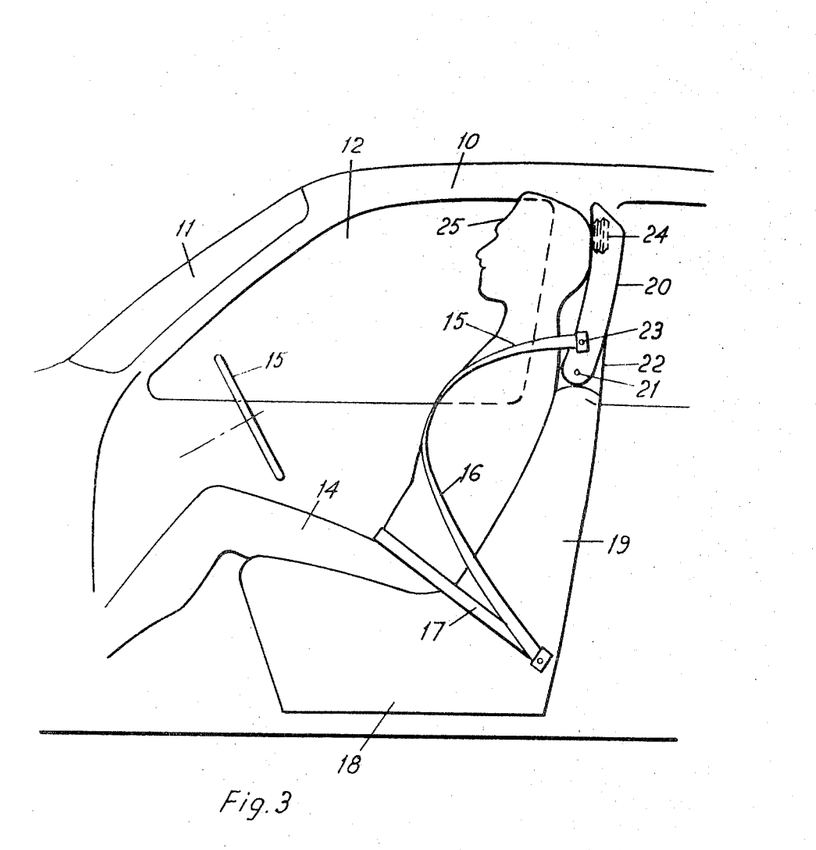
FIG. 3 is a view similar to FIG. 2 but showing how as a result of the frontal impact on the vehicle, the driver's head has subsequently been flung backwards against the head-rest.

FIGS. 1 to 3 show schematically such portions of parts of a motor vehicle body as are necessary for an understanding of one embodiment of the invention. In these Figures the vehicle body has a roof 10, a windscreen 11, a right-hand side front window 12, and a steering wheel 13. 14 designates an occupant of the vehicle, in this case the driver, who is shown in FIG. 1 as being seated, in a normal driving position, on a driver's seat 18 of the vehicle. The driver is strapped in his seat 18 by means of a seat belt arrangement comprising two shoulder belts 15, 16 and a lap belt 17. The seat 18 has a back-rest 19 with an upper end at approximately the level of the driver's shoulders when he is seated in his normal driving position. The back-rest 19 has an upward extension in the form of a frame 22 which extends upwardly from the upper end of the back-rest to a point adjacent the roof 10 of the vehicle. A head-rest 20 is pivotally mounted at its lower end on the extension 22 so that the head-rest can move pivotally relative to the back-rest and the extension about a hinge axis indicated generally at 21. This pivotal movement of the head-rest is controlled by the two shoulder belts 15, 16 which are secured at their respective upper ends to a respective one of the sides of the head-rest at a position above the hinge axis 21 and indicated generally by the reference numeral 23. The connexion of one belt 15 only is shown in FIGS. 1 to 3 but belt 16 is connected on the other side of the head-rest in like manner.

The shoulder belts 15, 16 are each detachably secured at their lower ends to an anchorage on the motor vehicle body adjacent the floor. In FIGS. 1 to 3 the shoulder belt 16, and one end of the lap belt 17 are shown secured to a common anchorage on the vehicle seat 18. Since the details of the securement of the belts to their anchorage form no part of the invention, and can be varied to suit particular installations they will not be further described.

Energy absorber means in the form of a corrugated and deformable metal tube 24 is secured between the head-rest 20 and the extension 22 of the back-rest 19. As shown in FIG. 1 the tube 24 is compressed longitudinally when installed in the vehicle and holds the head-rest 20 in its normal position relative to the extension 22 and the back-rest 19. FIG. 2 shows the head-rest immediately after a frontal impact on the vehicle. The occupant's head 25 has fallen forward as the efforts of the neck muscles to hold the head upright have been overcome by the loading imposed on them by the deceleration of the head. The loading imposed on the belts 15, 16 by the mass inertia of the occupant's body is now so great as to cause the belts to drag the head-rest 20 forward against the resistance of the energy absorber means 24 and the corrugated tube is deformed by being elongated (as seen in FIG. 2) with consequent absorption of energy. The head-rest 20 pivots forwardly to a position in which it supports the head 25 and thereby avoids the whip-lash action of the cervical column as the head is subsequently flung back. The head 25 also has an additional measure of protection in that as it presses back against the head-rest any backward movement of the head-rest is resisted by the extended tube 24 and any compression of the tube by the backward movement of the head-rest results in further absorption of energy by the tube with consequent diminution and slowing down of the backward movement of the head-rest and the head. Additionally, because of the forward pivotal movement of the head-rest the belt attachment points 23 also move forward and so permit the occupant's body to move forward to take up the slack in the belts 15, 16 resulting from this forward movement of the attachment points 23. This forward movement of the belts and so of the body means that upon reversal of movement of the body it has a greater distance to travel back to its original position and hence there is a greater distance in which to stop that backward movement.

FIG. 3 shows the occupant's body moved back against the seat. The occupant's head has pressed the head-rest 20 right back beyond its original position and compressed the energy absorber further than its original compression length. Kinetic energy which would otherwise have been absorbed by the head of the occupant is thus absorbed in deforming the tube 24.

Substantially the same position of the occupant as that shown in FIG. 3 would be achieved as the result of an impact on the rear of the vehicle. The shoulder belts 15 and 16 would also be tensioned as a result of the impact and would tighten against the occupant so preventing him from sliding up along the back-rest 19 so that his head engages the vehicle roof.

Figure 4:
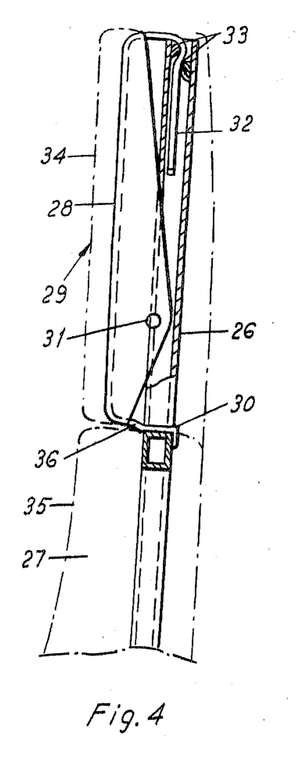
FIG. 4 is a schematic side view of part of a motor vehicle seat back-rest and head-rest for installation in a motor vehicle body, and illustrating a second embodiment of the invention.
Figure 5:
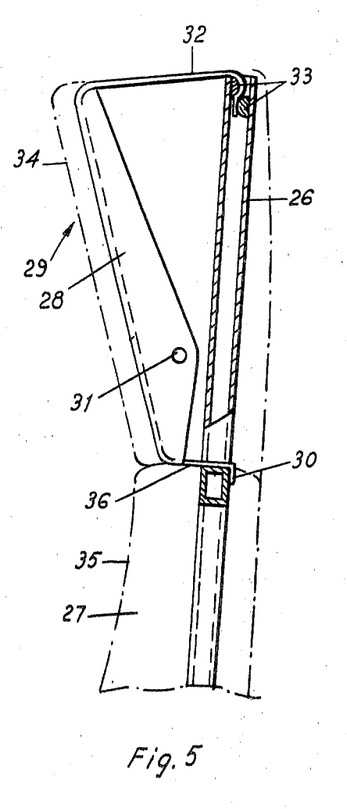
FIG. 5 is a view similar to FIG. 4 but showing the head-rest moved forward as a result of an impact on the vehicle in which the seat was installed.

FIGS. 4 and 5 are schematic side views of part of a motor vehicle seat back-rest and head-rest for installation in a motor vehicle body, and illustrating a second embodiment of the invention. Since this embodiment of the invention has much in common with the first embodiment described above with reference to FIGS. 1 to 3 of the drawings, only those parts wherein this embodiment differs are shown in FIGS. 4 and 5. In this embodiment 26 denotes a hollow reinforcing frame for a back-rest 27. A sheet metal carrier 28 for a head-rest 29 is secured to the frame 26 on a level with the upper edge of the back-rest 27. Reference numeral 30 indicates generally the location of the attachment of the carrier 28 to the back-rest 27. Conveniently, the carrier 28 may be welded to the frame 26. The carrier has side flanges, one only of which is shown, and on each of these side flanges is a location point 31 for the attachment thereto of a respective upper end of a shoulder belt (not shown). At its upper end the sheet metal carrier has at least one bent-over generally rectangular end portion 32 which extends from the head-rest into the interior of the frame 26 between two protuberances 33 offset relative to one another and located within the frame adjacent the upper end thereof. The protuberances 33 constitute guide means which exert a clamping or gripping action on the end portion 32. Reference numerals 34 and 35 denote padding for the head-rest and back-rest respectively.

FIG. 5 shows how the head-rest 29 is moved forward as a result of a front end impact on the vehicle in which the seat was installed. The head-rest 29 in this embodiment does not pivot about a hinge axis but a portion 36 of the extension adjacent the back-rest acts as a plastically deformable connexion and when the loading developed by the mass inertia of the occupant's body is transmitted by the shoulder belts (as in the above-described embodiment with reference to FIGS. 1 to 3) to the head-rest 29, the plastically deformable connexion deforms and permits the forward movement of the head-rest. As the head-rest 29 is moved forward in response to the loading transmitted to it by the belts so the end portion 32 is pulled outwardly of the guide means against a resistance exerted on it by the clamping or gripping action of the protuberances 33. The dimensions of the end portion 32 would be such that the end portion itself would not be pulled entirely out of the interior of the frame 26, so that when the occupant's head is flung back the head-rest would push the end portion back into the interior of the frame against the resistance of the protuberances 33. In this embodiment the guide means 33 and the end portion 32 act as an energy absorber, with the same effect as the tube 24 described above with reference to FIGS. 1 to 3. The plastically deformable connexion 36 can also act as an energy absorber.

Figure 6:
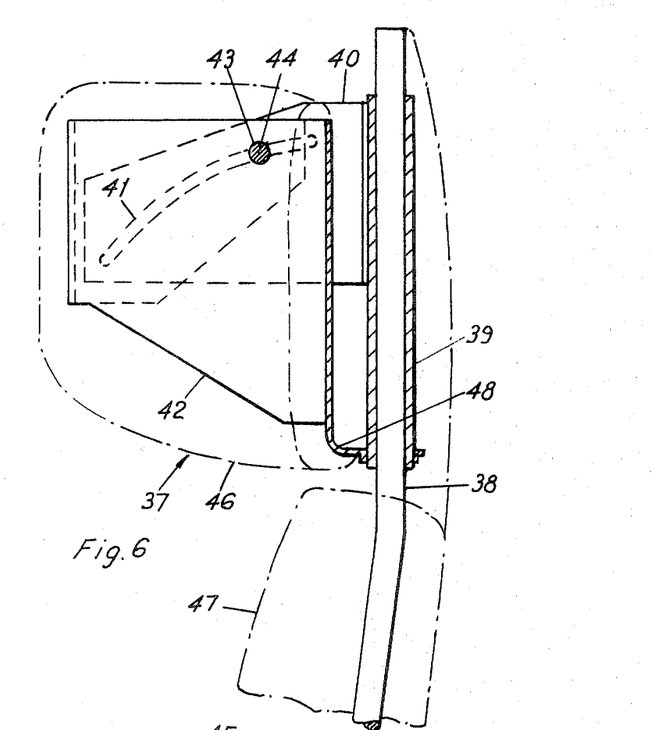
FIG. 6 is a view similar to FIG. 4 but showing a third embodiment of the invention.
Figure 7:
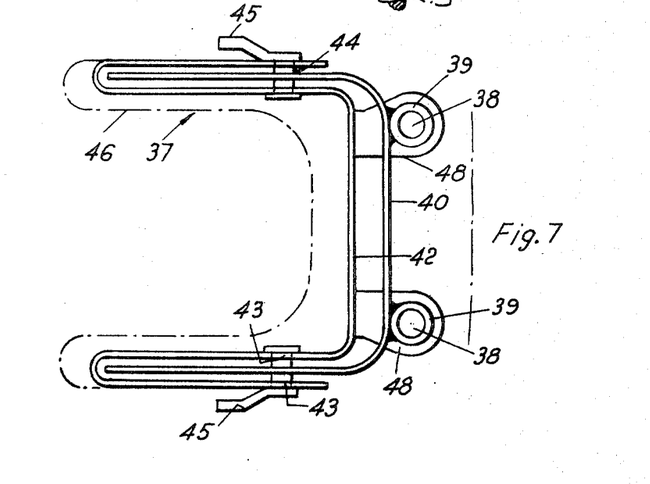
FIG. 7 is a plan view of FIG. 6.
Figure 8:
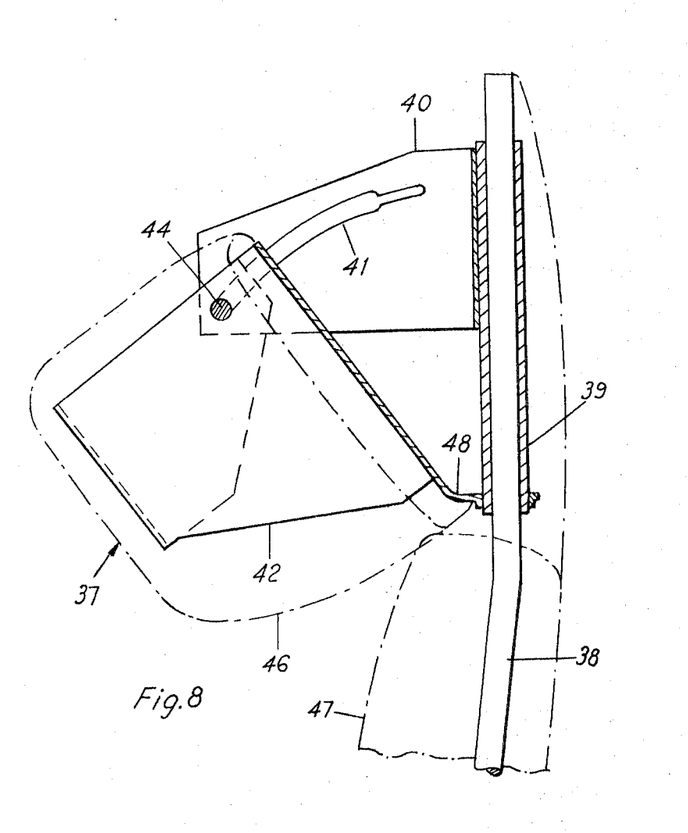
FIG. 8 is a view similar to FIG. 6 but showing the head-rest moved forwardly as a result of an impact on the vehicle containing the seat.

FIGS. 6 to 8 illustrate a third embodiment of the invention. As in FIGS. 4 and 5, FIGS. 6 to 8 show only those details wherein this embodiment differs from that shown in FIGS. 1 to 3. In this third embodiment there is provision for raising or lowering the height of a head-rest 37 relative to a tubular back-rest frame. In this embodiment the head-rest has a back portion and two side portions.

As best seen in FIG. 7, which is a plan of the embodiment shown schematically in side elevation in FIG. 6, the back-rest extension has two generally vertical portions 38 extending beyond the top of the padding 47 of the back-rest. On each extension portion 38 is mounted a sleeve 39, and a head-rest frame 42 is secured, as by welding, to the lower end of each sleeve. The sleeves 39 may be a tight fit on the portions 38 or may be retained thereon by suitable means (not shown) permitting adjustment of the height of the head-rest 37 relative to the back-rest.

The back-rest extension includes a rectangular sheet-metal plate 40 having two facing side portions spaced from one another by an intermediate portion, so that, as seen in FIG. 7 that plate 40 is generally U-shaped in plan. The plate is welded to the tubes 39. The side portions of the plate each have an arcuate slot 41 therein in each of which is located a headed pin 44 as will be described later.

The head-rest 37 includes a reinforcement plate 42 having an intermediate portion extending across the back of the head-rest and has two facing side portions each comprising a reversely bent sheet defining a generally double-walled side member U-shaped in plan as seen in FIG. 7 and receiving between its walls a respective one of the sides of the plate 40. Each headed pin 44 also extends through two aligned apertures, one in each wall of each side member and a shoulder belt retainer 45 is secured to the free end of each pin. The reinforcement plate 42 has two rearwardly extending apertured lugs 48 which fit on respective ones of the sleeves 39 and are secured to the lower ends of the tubes as by welding. The lugs 48 constitute a plastically deformable connexion permitting movement of the head-rest forward in response to the loading transmitted from the occupant's body by way of the shoulder belts (not shown) as described with reference to the preceding embodiments.

The arcuate slots 41 each have a width which is less than the diameter of the headed pin 44 inserted through the slot except that each slot is enlarged at one point intermediate its length so as to receive the pin 44 without any deformation of the slot. FIG. 8 shows the head-rest moved forward as a result of a frontal impact on the vehicle. As the head-rest moved forward in response to the pull exerted on it by the shoulder belts (not shown) so the pins 44 deformed the arcuate slots 41 and this deformation absorbed energy. The pins and slots thus function as an energy absorber. Backward movement of the head-rest is resisted by the movement of the pins into the narrow part of their slots as the pins move from left to right from the position shown in FIG. 8.

Figure 9:
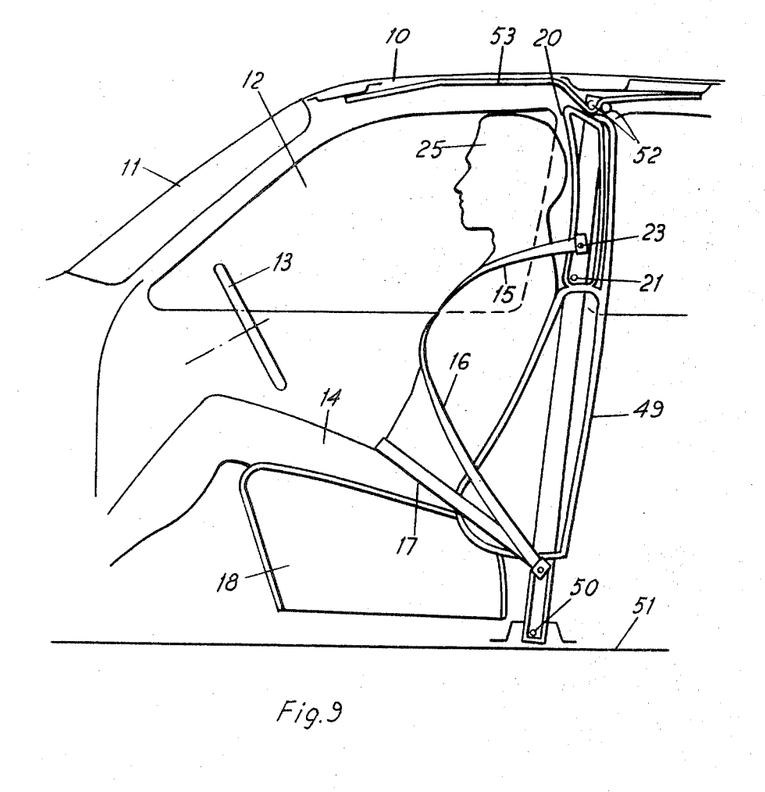
FIG. 9 is a view similar to FIG. 1 but showing a fourth embodiment of the invention; and, FIG. 10 is a similar view to FIG. 9 but showing the driver, the seat back-rest and the head-rest moved forward in the vehicle body as a result of, and immediately after, a frontal impact on the vehicle.
Figure 10:
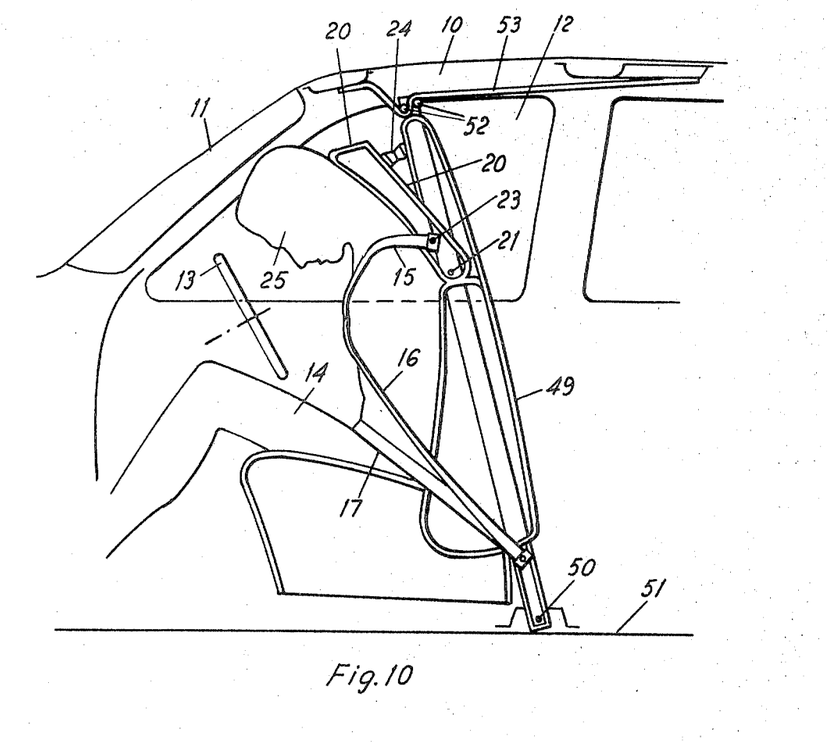

FIGS. 9 and 10 are schematic views similar to FIGS. 1 and 2 but showing a fourth embodiment of the invention. In this embodiment like parts to those shown in FIGS. 1 to 3 have the same reference numerals and will not be described further here.

In this embodiment however, the seat back-rest 49 is pivotally mounted at its lower end to the vehicle floor 51 so that the back-rest can pivot about an axis 50 extending transversely of the vehicle. The back-rest 49 has a frame extension at its upper end like the frame extension 26 described with reference to FIGS. 4 and 5 and has guide means 52 similar to the guide means 33 shown in FIGS. 4 and 5. A deformable plate 53 secured at least at one end to the vehicle roof 10 is clamped between the guide means 53. As shown in FIG. 10 when the seat occupant is flung forward as a result of a frontal impact on the vehicle the head-rest 20 and the seat back-rest 49 also pivot forwardly. The plate 53 resists this forward movement by reason of its plastic deformation as the guide means 52 travel along the plate. The same action though in reverse direction takes place as the head-rest and seat back-rest move backwards as the head is flung back. In both directions of movement energy is absorbed by the deformation of the plate 53 which in conjunction with the guide means 52 acts as an energy absorber in the same manner as the energy absorbers of the previously described embodiments. This embodiment has the advantage that because the back-rest is pivotally mounted on the vehicle floor it too can conform to the bodily position of the seat occupant while the head-rest conforms to the position of the occupant's head.

If desired, the energy absorbers and head-rests described with reference to the previously described embodiments could equally well be used in this fourth embodiment.

All the embodiments described above afford protection for the head of the occupant in the event of a rear-end impact on the vehicle.

In the embodiments described above the energy absorbers could be designed to provide varying degrees of resistance to deformation. In the embodiments described above the energy absorbers would be designed to operate only when a predetermined rate of deceleration of the vehicle was attained as a result of impact, whether on the front or rear of the vehicle, thus avoiding the possibility of inadvertent operation for example owing to some unexpectedly violent movement of the seat occupant.

Although the four embodiments described above all use shoulder belts to transmit the loading from the occupant to the head-rest, as mentioned earlier other means effective to transmit the loading from the occupant to the head-rest could be employed.

I claim:

1. A motor vehicle body including a floor, a seat secured to the floor and having a front end and a rear end, and a back-rest secured to the rear end of the seat; a head-rest mounted on the back-rest and movable forwardly and rearwardly of the back-rest towards the front end and rear end respectively of the seat; means effective, upon engagement therewith by an occupant of the seat moving in response to the effect upon him of a predetermined deceleration of the vehicle body, to transmit a loading developed by the mass inertia of the occupant to the head-rest thereby to move the head-rest forwardly; and energy absorber means secured between the head-rest and an anchorage on the vehicle body and deformable by the movement of the head-rest so as to resist the forward movement of the head-rest and resist backward movement of the head-rest upon impact thereon of the backwardly moving head of the occupant.

2. A motor vehicle body including a floor, a seat secured to the floor and having a front end and a rear end, and a back-rest secured to the rear end of the seat; a head-rest mounted on the back-rest and movable forwardly and rearwardly of the back-rest towards the front end and rear end respectively of the seat; a releasable seat belt arrangement arranged to encircle and restrain an occupant of the seat, and including a belt secured to the head-rest; the seat belt when secured being arranged, upon a predetermined deceleration of the vehicle body, to transmit a loading developed by the mass inertia of the occupant to the head-rest thereby to move the head-rest forwardly; and energy absorber means secured between the head-rest and an anchorage on the vehicle body and deformable by the movement of the head-rest so as to resist the forward movement of the head-rest and resist backward movement of the head-rest upon impact thereon of the backwardly moving head of the occupant.

3. The motor vehicle body according to claim 2, wherein the energy absorber means is a deformable metal tube secured at one end to said head-rest and at the other end to said anchorage.

4. A motor vehicle body including a floor, a seat secured to the floor and having a front end and a rear end, and a back-rest secured to the rear end of the seat; a head-rest mounted on the back-rest and movable forwardly and rearwardly of the back-rest towards the front end and rear end respectively of the seat; a releasable seat belt arrangement arranged to encircle and restrain an occupant of the seat and including a belt secured to the head-rest; the seat belt when secured being arranged upon a predetermined deceleration of the vehicle body, to transmit a loading developed by the mass inertia of the occupant to the head-rest thereby to move the head-rest forwardly; and energy absorber means secured between the head-rest and an anchorage on the vehicle body and deformable by the movement of the head-rest so as to resist the forward movement of the head-rest and resist backward movement of the head-rest upon impact thereon of the backwardly moving head of the occupant; said head-rest being mounted on the back-rest by an articulation, and said belt being a shoulder belt having an upper end secured to said head-rest.

5. A motor vehicle body including a floor, a seat secured to the floor and having a front end and a rear end, and a back-rest secured to the rear end of the seat; a head-rest mounted on the back-rest and movable forwardly and rearwardly of the back-rest towards the front end and rear end respectively of the seat; a releasable seat belt arrangement arranged to encircle and restrain an occupant of the seat; the seat belt when secured being arranged, upon a predetermined deceleration of the vehicle body, to transmit a loading developed by the mass inertia of the occupant to the head-rest thereby to move the head-rest forwardly; said back-rest having an upward extension; and energy absorber means secured to said head-rest and said back-rest and deformable by the movement of the head-rest so as to resist the forward movement of the head-rest and resist backward movement of the head-rest upon impact thereon of the backwardly moving head of the occupant.

6. A motor vehicle body including a floor, a seat secured to the floor and having a front end and a rear end, and a back-rest secured to the rear end of the seat; said back-rest having an upward extension; a head-rest mounted on the back-rest and movable forwardly and rearwardly of the back-rest towards the front end and rear end respectively of the seat; a releasable seat belt arrangement arranged to encircle and restrain an occupant of the seat, and including a belt secured to the head-rest; the seat belt when secured being arranged, upon a predetermined deceleration of the vehicle body, to transmit a loading developed by the mass inertia of the occupant to the head-rest thereby to move the head-rest forwardly; and energy absorber means secured between the head-rest and an anchorage on the vehicle body and deformable by the movement of the head-rest so as to resist the forward movement of the head-rest and resist backward movement of the head-rest upon impact thereon of the backwardly moving head of the occupant; said back-rest extension having a hollow portion open at one end, guide means on said hollow portion adjacent said open end, and said head-rest having a sheet metal plate extending therefrom through said guide means into said hollow portion, said guide means exerting a clamping action on said plate thereby deforming said plate upon movement of the plate relative to said guide means upon movement of said head-rest, said guide means and said plate constituting said energy absorber.

7. A motor vehicle body including a floor, a seat secured to the floor and having a front end and a rear end, and a back-rest secured to the rear end of the seat; a head-rest mounted on the back-rest by means of a plastically deformable connexion, and movable by reason of said connexion forwardly and rearwardly of the back-rest towards the front end and rear end respectively of the seat; a releasable seat belt arrangement arranged to encircle and restrain an occupant of the seat; the seat belt when secured being arranged, upon a predetermined deceleration of the vehicle body, to transmit a loading developed by the mass inertia of the occupant to the head-rest thereby to move the head-rest forwardly; and energy absorber means secured between the head-rest and an anchorage on the vehicle body and deformable by the movement of the head-rest so as to resist the forward movement of the head-rest and resist backward movement of the head-rest upon impact thereon of the backwardly moving head of the occupant.

8. A motor vehicle body including a floor, a seat secured to the floor and having a front end and a rear end, and a back-rest secured to the rear end of the seat; an upward extension on said back-rest, a head-rest mounted on the back-rest by means of a connexion capable of acting as an articulation permitting movement of the head-rest forwardly and rearwardly of the back-rest towards the front and rear end respectively; a head-rest mounted on the back-rest and movable forwardly and rearwardly of the back-rest towards the front end and rear end respectively of the seat; a releasable seat belt arrangement arranged to encircle and restrain an occupant of the seat, and including a belt secured to the head-rest; the seat belt when secured being arranged, upon a predetermined deceleration of the vehicle body, to transmit a loading developed by the mass inertia of the occupant to the head-rest thereby to move the head-rest forwardly; and energy absorber means secured between the head-rest and an anchorage on the vehicle body and deformable by the movement of the head-rest so as to resist the forward movement of the head-rest and resist backward movement of the head-rest upon impact thereon of the backwardly moving head of the occupant; said energy absorber comprising a pair of facing members at each side of said head-rest, one member of each pair forming part of the head-rest and the other member being secured to the upward extension; one of said members of each pair having a slot formed therein and the other of said members having a pin mounted therein and engageable in said slot whereby upon movement of said head-rests one member of said pair is moved relative to the other and by reason of said movement said pin deforms said slot and by said distortion energy is absorbed.

9. A motor vehicle body including a roof and a floor, a seat secured to the floor and having a front end and a rear end, and a back-rest pivotally mounted on the floor adjacent the rear end of the seat; an upward extension on said back-rest;

a head-rest mounted on the extension and movable forwardly and rearwardly of the back-rest towards the front end and rear end respectively of the seat; a releasable seat belt arrangement arranged to encircle and restrain an occupant of the seat, and including a belt secured to the head-rest; the seat belt when secured being arranged, upon a predetermined deceleration of the vehicle body, to transmit a loading developed by the mass inertia of the occupant to the head-rest thereby to move the head-rest forwardly; and energy absorber means secured between the head-rest and an anchorage on the vehicle body and deformable by the movement of the head-rest so as to resist the forward movement of the head-rest and resist backward movement of the head-rest upon impact thereon of the backwardly moving head of the occupant; said energy means comprising guide means mounted on the upper end of said extension adjacent said roof; a metal plate secured to said roof and extending through said guide means whereby upon said movement of said head-rest and consequent movement of said back-rest and said extension said guide means travel along said plate and plastically deform said plate with consequent absorption of energy.

10. A motor vehicle body including a floor, a seat secured to the floor and having a front end and a rear end, and a back-rest secured to the rear end of the seat; a head-pivotally mounted on the back-rest and tiltable forwardly and rearwardly of the back-rest towards the front end and rear end respectively of the seat; a releasable seat belt arrangement arranged to encircle and restrain an occupant of the seat, and including two shoulder belts secured to the head-rest; the seat belt when secured being arranged, upon a predetermined deceleration of the vehicle body, to transmit a loading developed by the mass inertia of the occupant to the head-rest thereby to tilt the head-rest forwardly and energy absorber means comprising a deformable metal tube secured at one end to the head-rest and at the other end to the back-rest, and upon said forward tilting of said heat-rest said tube is elongated and by reason of said elongation absorbs energy so as to resist the forward tilting of the head-rest and, upon backward tilting movement of the head-rest upon impact thereon of the backwardly moving head of the occupant, said tube is compressed and by reason of said compression absorbs energy and resists said backward tilting of said head-rest.

* * * * *